(12) United States Patent
Na et al.

(10) Patent No.: US 8,790,843 B2
(45) Date of Patent: Jul. 29, 2014

(54) FUEL CELL STACK

(75) Inventors: Young-Seung Na, Suwon-si (KR); Jun-Won Suh, Suwon-si (KR); In-Seob Song, Suwon-si (KR); Keun-Yong Lee, Suwon-si (KR); Sung-Won Jeong, Suwon-si (KR); Chan-Gyun Shin, Suwon-si (KR)

(73) Assignee: Samsung SDI Co., Ltd (KR)

( * ) Notice: Subject to any disclaimer, the term of this patent is extended or adjusted under 35 U.S.C. 154(b) by 413 days.

(21) Appl. No.: 12/019,012

(22) Filed: Jan. 24, 2008

(65) Prior Publication Data
US 2008/0268315 A1    Oct. 30, 2008

(30) Foreign Application Priority Data

Apr. 25, 2007    (KR) .................. 10-2007-0040247

(51) Int. Cl.
*H01M 8/02*    (2006.01)
*H01M 8/10*    (2006.01)

(52) U.S. Cl.
USPC ........... 429/514; 429/413; 429/437; 429/457; 429/458; 429/465; 429/492

(58) Field of Classification Search
USPC ............. 429/30, 38, 413, 437, 457, 458, 465, 429/492, 514
IPC ............................................... H01M 8/02,8/10
See application file for complete search history.

(56) References Cited

U.S. PATENT DOCUMENTS

| | | | |
|---|---|---|---|
| 6,503,653 B2 | 1/2003 | Rock | |
| 2003/0152819 A1* | 8/2003 | Hatoh et al. | 429/32 |
| 2004/0058221 A1* | 3/2004 | Chaix | 429/38 |
| 2004/0258971 A1* | 12/2004 | Gyoten et al. | 429/26 |
| 2005/0074652 A1* | 4/2005 | Choi | 429/32 |
| 2005/0079402 A1* | 4/2005 | Tanaka et al. | 429/40 |
| 2005/0208364 A1* | 9/2005 | Nakagawa et al. | 429/38 |
| 2006/0068266 A1* | 3/2006 | Hanlon | 429/38 |
| 2006/0275643 A1* | 12/2006 | Abd Elhamid et al. | 429/38 |
| 2007/0087257 A1* | 4/2007 | Son et al. | 429/38 |
| 2008/0118783 A1* | 5/2008 | Cetegen et al. | 429/12 |

FOREIGN PATENT DOCUMENTS

DE    10 2005 021 487 A1    11/2006

(Continued)

OTHER PUBLICATIONS

Machine translaiton of Dirk (DE102005021487) Nov. 2006.*

(Continued)

*Primary Examiner* — Jun Li
(74) *Attorney, Agent, or Firm* — Knobbe, Martens, Olson & Bear LLP

(57) ABSTRACT

A fuel cell stack includes a plurality of membrane electrode assemblies (MEAs) and a stamped metal separator. The metal separator is positioned between the membrane electrode assemblies. The separator includes at least one channel on both surfaces of the separator formed by a stamping process. The separator comprises a plurality of holes, each of which form a manifold communicating with each the channels.

17 Claims, 7 Drawing Sheets

(56) References Cited

FOREIGN PATENT DOCUMENTS

| | | | |
|---|---|---|---|
| DE | 10 2005 026 060 | A1 | 11/2006 |
| JP | 09-161825 | A | 6/1997 |
| JP | 2000-182637 | A | 6/2000 |
| JP | 2000-235861 | A | 8/2000 |
| JP | 2000-311696 | A | 11/2000 |
| JP | 2001-35514 | A | 2/2001 |
| JP | 2003-249241 | A | 9/2003 |
| JP | 2004-273314 | A | 9/2004 |
| JP | 2005-353521 | A | 12/2005 |
| JP | 2006-172949 | A | 6/2006 |
| JP | 2006-278247 | A | 10/2006 |
| KR | 10-0446545 | B1 | 9/2004 |

OTHER PUBLICATIONS

Search Report issued Jun. 18, 2008 in corresponding European patent application No. 08102280 in 7 pages.
Communication pursuant to Article 94(2) EPC issued Sep. 6, 2011 in corresponding European patent application No. 08102280.8.
JPO Office Action (Japanese only) dated Sep. 13, 2001 in JP 2008-073496.
EPO Communication pursuant to Article 94(3) EPC in related European Application No. 08 102 280.8 dated Sep. 26, 2011.
EPO Communication pursuant to Article 94(3) EPC in related European Application No. 08 102 280.8 dated Jul. 9, 2012.
EPO Communication pursuant to Article 94(3) EPC in related European Application No. 08 102 280.8 issued Jan. 14, 2014.

* cited by examiner

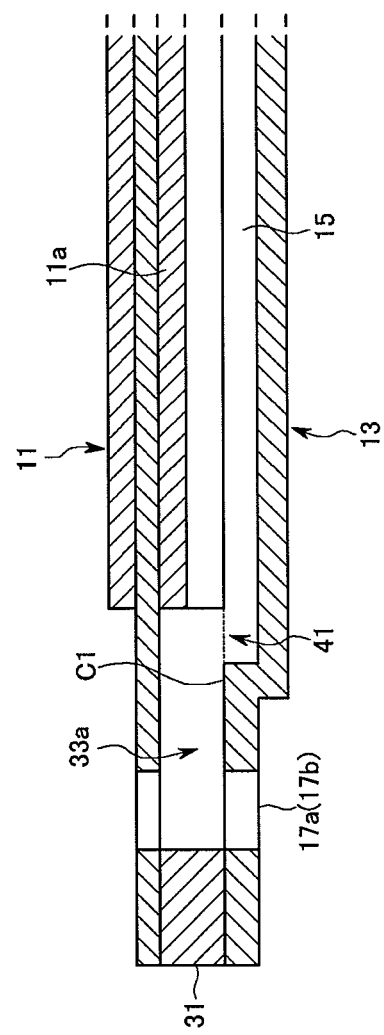

FUEL CELL STACK

CROSS-REFERENCE TO RELATED APPLICATION

This application claims priority to and the benefit of Korean Patent Application No. 10-2007-0040247 filed in the Korean Intellectual Property Office on Apr. 25, 2007, the entire content of which is incorporated herein by reference.

BACKGROUND

1. Field

The present disclosure relates to a fuel cell, and more particularly, to a stack of for a fuel cell.

2. Discussion of the Related Technology

Generally, a fuel cell includes a generator for generating electrical energy by an oxidation reaction of fuel and a reduction reaction of an oxidizing gas. The fuel cell may be classified as a polymer electrolyte membrane fuel cell and a direct oxidation fuel cell according to a type of fuel. In the polymer electrolyte membrane fuel cell, a reformed gas from a liquid or gas fuel and an oxidizing gas are received, and electrical energy is generated by an oxidation reaction of the reformed gas and a reduction reaction of the oxidizing gas. In the direct oxidation fuel cell, liquid fuel and oxidizing gas are received, and electrical energy is generated by an oxidation reaction of the fuel and a reduction reaction of the oxidizing gas.

The fuel cell is formed as a stack in which unit cells respectively including a membrane electrode assembly (MEA) and a separator are sequentially arranged. Here, the separator is disposed on both sides of the membrane electrode assembly, and both sides respectively include a channel for supplying the reformed gas or fuel and the oxidizing gas to the membrane electrode assembly. In the above fuel cell, the separator of the unit cell is formed of composites containing graphite or carbon, and a thickness of the separator is not less than about 0.4-about 0.6 mm to prevent a gas or a liquid from penetrating the separator. Accordingly, there are problems of excessive thickness of the separator, a complicated manufacturing process, and a high cost. Recently, a metal separator has been used to solve the above problems. In this separator, there is a merit in that the thickness is reduced to be less than that of the graphite- or carbon-containing composites. In the metal separator, to maintain a minimum thickness, a stamping process is performed to form the channel at both surfaces of the separator. However, while corrugated channels having opened ends are formed on the entire plane surface of the separator, an additional manifold for supplying the reformed gas or fuel and the oxidizing gas to the channel is not formed. When the stack includes the separator without the manifold, a pumping pressure for supplying the reformed gas or fuel and the oxidizing gas to the channel is increased, and therefore power consumption of a pump is problematically increased.

In addition, a single serpentine channel may be formed on one surface of the separator by the stamping process to form the manifold to the separator, but the channel may not be formed on the other surface of the separator. Accordingly, according to the prior art, the serpentine channel is formed by the stamping process on one surface, and the respective separators include the manifold connected to the channel. However, in this case, it is difficult to minimize the volume of the entire stack.

The discussion in this section is to provide general background section, and does not constitute an admission of prior art.

SUMMARY

An aspect of the invention provides a fuel cell stack comprising: a plurality of membrane electrode assemblies (MEAs) comprising a first MEA and a second MEA; a stamped metal separator positioned between the first MEA and the second MEA, wherein the stamped metal separator comprises a first surface facing the first MEA and a second surface facing the second MEA, wherein the first MEA and the first surface of the stamped metal separator contact each other and form a first channel therebetween, wherein the first channel has two ends, each of which is connected to a first manifold through which reactants or resultants of a fuel cell reaction are configured to flow, wherein the second MEA and the second surface of the stamped metal separator contact each other and form a second channel therebetween, wherein the second channel has two ends, each of which is connected to a second manifold through which reactants or resultants of a fuel cell reaction are configured to flow.

In the foregoing stack, each of the first and second surfaces may comprise protrusions and depressions. The stamped metal separator may comprise a plurality of stamped corrugations. Each of the first and second channels may be formed in a serpentine shape. Each of the first and second manifolds may comprise a hole formed on the stamped metal separator. Both ends of each of the first and second channels may be closed in the separators. The first channel and the first manifold may be separately formed on the stamped metal separator, and the second channel and the second manifold may be separately formed on the stamped metal separator. The first channel may be configured to supply an oxidizing gas to the first MEA. The second channel may be configured to supply a fuel to the second MEA. The stamped metal separator may comprise only a single stamped recess on the second surface which is configured to form the second channel. The stamped metal separator may comprise at least one selected from the group consisting of aluminum, copper, iron, nickel, and cobalt. The stamped metal separator may comprise a bipolar plate.

The foregoing fuel cell stack may comprise a gasket disposed between peripheries of the stamped metal separator and the first MEA. The gasket may be configured to form a first passage interposed between the one of the two ends of the first channel and the first manifold. The first passage may comprise a groove formed on the gasket. The first MEA may comprise an electrolyte membrane, a cathode formed on one surface of the electrolyte membrane except at a periphery of the electrolyte membrane, and an anode formed on another surface of the electrolyte membrane except at the periphery, wherein the gasket contacts the electrolyte membrane and the first surface of the stamped metal separator to form a seal between the peripheries of the first MEA and the stamped metal separator. The gasket is formed of silicon rubber.

Still in the foregoing fuel cell stack may comprise one or more additional stamped metal separators, wherein the stamped metal separators and the MEAs may be arranged alternately. The fuel cell stack comprises a direct oxidation fuel cell. The first surface may comprise a stamped recess configured to form the first channel. A first imaginary line along the first channel between the two ends thereof may not intersect a second imaginary line along the second channel between the two ends thereof when viewed in a direction generally perpendicular to a surface of the MEA contacting the first surface. The first MEA and the first surface may form a third channel therebetween, wherein the third channel may have two ends, each of which is connected to a third manifold through which reactants or resultants of a fuel cell reaction are configured to flow, and wherein a third imaginary line along the third channel between the two ends thereof may not intersect the second imaginary line when viewed in the direction generally perpendicular to the surface of the MEA contacting the first surface.

Embodiments of the present invention has been made in an effort to provide a fuel cell stack including a metal separator having channels on both surfaces of the separator by a stamping process, and a manifold connected to the respective channels.

An exemplary fuel cell stack according to an embodiment of the present invention includes a membrane electrode assembly (MEA) and a metal separator positioned on both sides of the MEA. The separator includes at least one channel on both surfaces thereof formed by a stamping process, and a manifold communicating with both ends of the respective channels. Protrusions and depressions are formed on both surfaces of the separator, and a groove part of the protrusions and depressions may be formed as the channel. The manifold may be formed as a hole of the separator. The channel and the manifold may be separately formed. Both ends of the channel are closed. The separator may include a first channel formed on one surface thereof and a second channel formed on another surface thereof. A plurality of first channels are provided on the surface of the separator, and each first channel includes an oxidizing gas flow path for supplying an oxidizing gas to the MEA. A single second channel is provided between the oxidizing gas flow paths on the other surface of the separator, and it comprises a fuel flow path for supplying a fuel to the MEA. The first channel and the second channel are not overlapped on both surfaces of the separator. The first channel may be formed as a groove part on one surface of the separator and as a protrusion part on the other surface of the separator, and the second channel may be formed as a protrusion part on one surface and a groove part on the other surface. The separator may be formed by an alloy material of one or more metals among aluminum, copper, iron, nickel, and cobalt. The separator may be a bipolar plate.

The fuel cell stack may further include a gasket disposed on an edge area between the separator and the MEA. The gasket includes a passage for forming a path between the channel and the manifold. In this case, the passage is formed as a groove in the gasket. The MEA includes an electrolyte membrane, a cathode, and an anode. The cathode is formed on one surface of the electrolyte membrane except at an edge area of the electrolyte membrane. The anode is formed on the other surface of the electrolyte membrane except at the edge area. The gasket may be formed with a thickness obtained by adding the protrusion part of the channel and a thickness of the electrode, based on the separator and the membrane electrode assembly facing each other. The gasket includes a passage for forming a path between the channel and the manifold, and the path having the thickness of the gasket includes the passage connecting the channel to the manifold. The gasket may be formed of silicon rubber. The separator and the MEA may be alternately and sequentially disposed. The stack is included in a direct oxidation fuel cell.

BRIEF DESCRIPTION OF THE DRAWINGS

The accompanying drawings, together with the specification, illustrate exemplary embodiments of the present invention, wherein:

FIG. 5A and FIG. 5B respectively show schematic diagrams of a connection structure of a channel and a manifold.

DETAILED DESCRIPTION OF EMBODIMENTS

Embodiments of the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Figure 1:
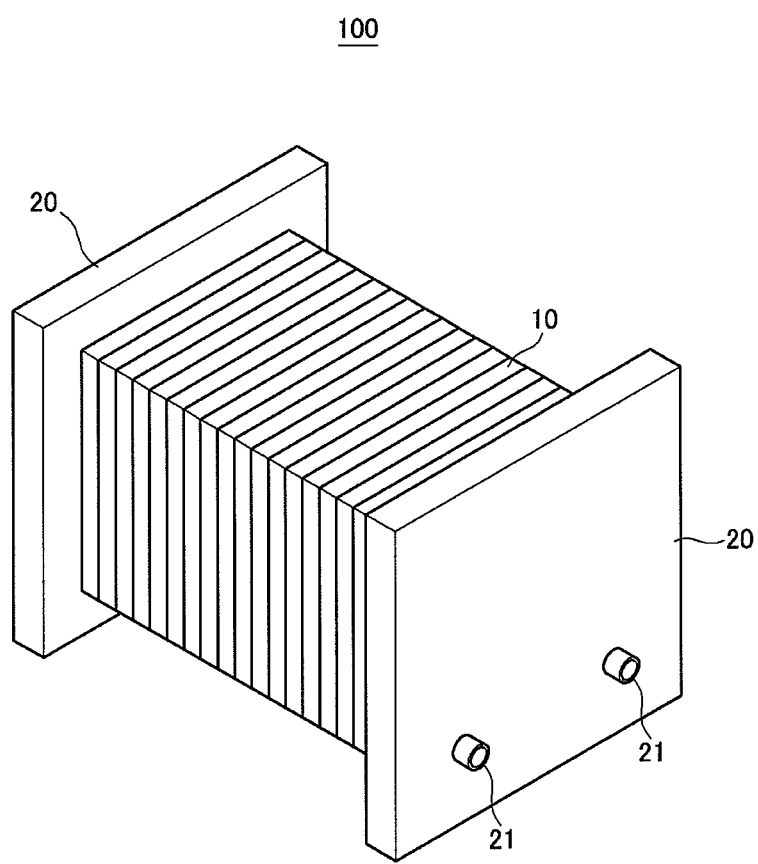
FIG. 1 shows a perspective view representing a fuel cell stack according to an exemplary embodiment of the present invention.

FIG. 1 shows a perspective view representing a fuel cell stack according to an exemplary embodiment of the present invention. As shown in FIG. 1, the fuel cell stack 100 according to an exemplary embodiment of the present invention is formed as a direct oxidation fuel cell for receiving an alcohol fuel such as methanol and ethanol and an oxidizing gas such as air, and generating electrical energy by an oxidation reaction of the fuel and a reduction reaction of the oxidizing gas. The fuel cell stack 100 according to the exemplary embodiment of the present invention includes a set of a plurality of sequentially arranged electric generating units 10, and a pressure plate 20 provided to both outer sides of the set. The pressure plates 20 are combined by a fastening member (not shown) and puts pressure on the electric generating units 10. Each pressure plate 20 includes a plurality of ports 21 for supplying the fuel and the oxidizing gas to the electric generating unit 10, and outputting remaining fuel and oxidizing gas after a reaction of the electric generating unit 10 and emissions generated by the electric generating unit 19.

Figure 2:
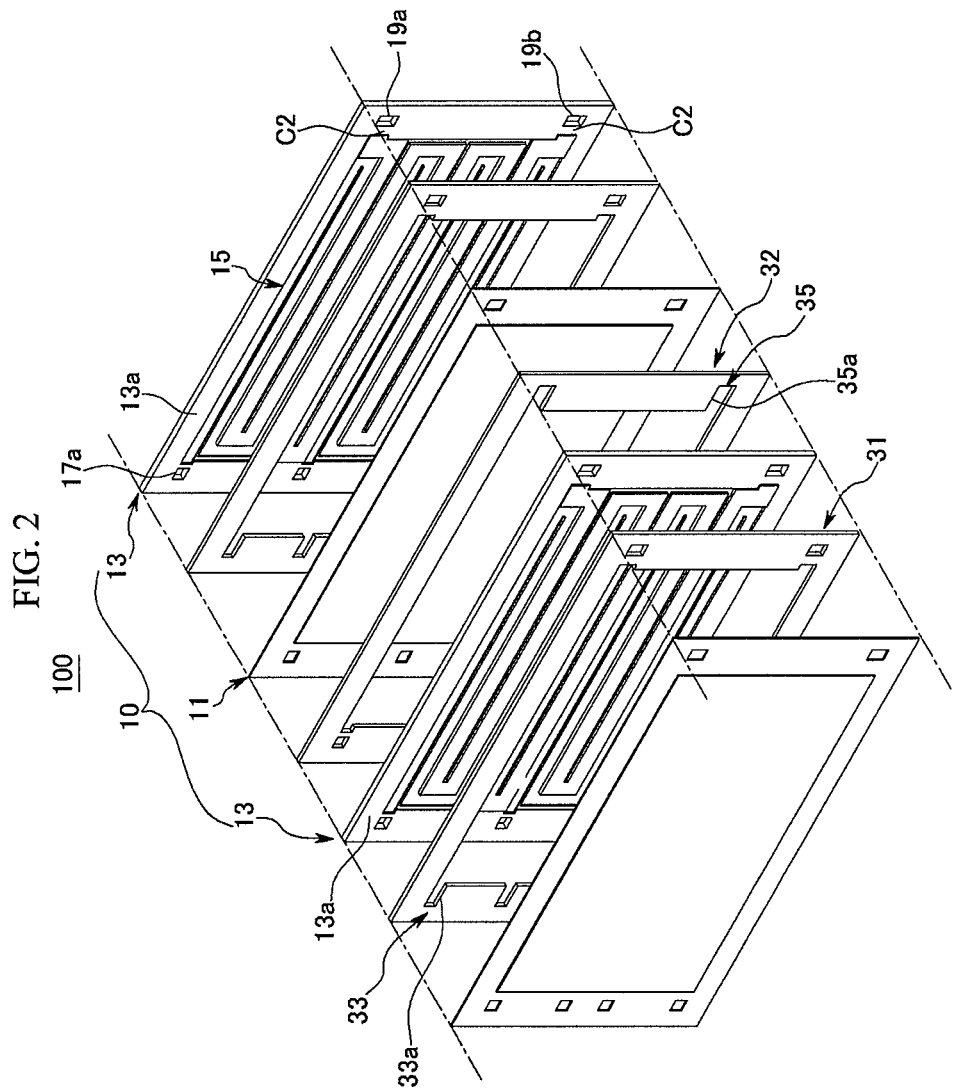
FIG. 2 shows a partial exploded perspective view of the fuel cell stack shown in FIG. 1.
Figure 3:
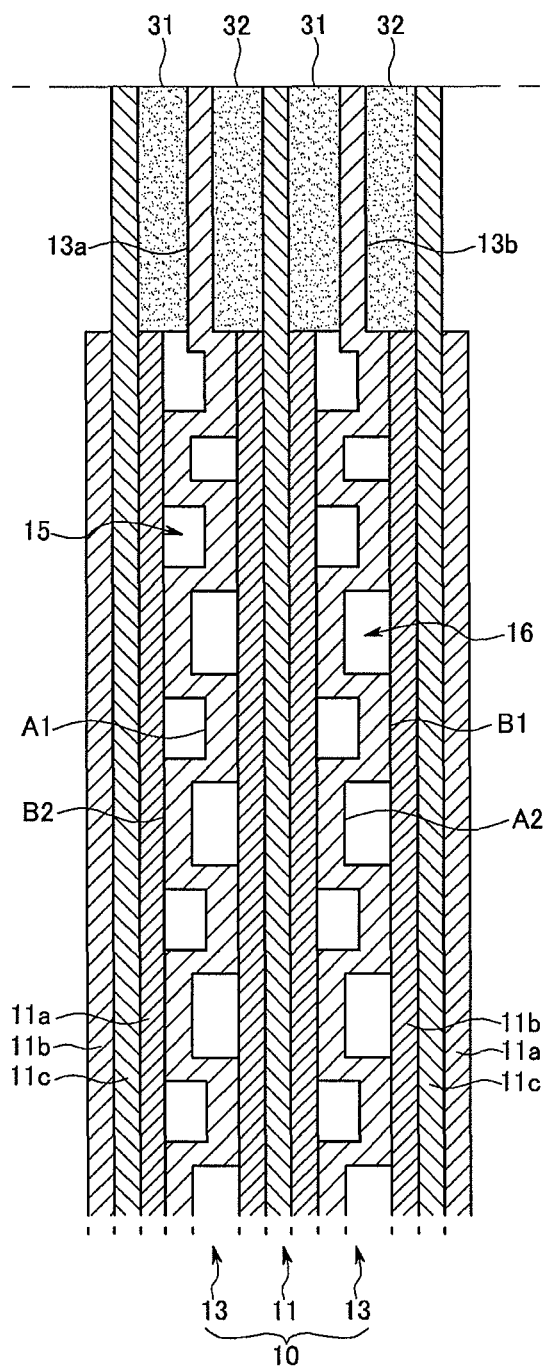
FIG. 3 shows a schematic cross-sectional view in which elements shown in FIG. 2 are combined.

FIG. 2 shows a partial exploded perspective view of the fuel cell stack shown in FIG. 1, and FIG. 3 shows a schematic cross-sectional view in which elements shown in FIG. 2 are combined. As shown in FIG. 2 and FIG. 3, each generating unit 10 according to the exemplary embodiment of the present invention is a unit cell for generating electrical energy by an electrochemical reaction of the fuel and the oxidizing gas. The generating unit 10 includes a membrane electrode assembly (MEA) 11, and a stamped separator 13 disposed on each side of the membrane electrode assembly 11. Accordingly, in the exemplary embodiment of the present invention, the membrane electrode assemblies 11 and the separators 13 are alternately arranged to form the fuel cell stack 100 that is a set of the electric generating units 10.

Each membrane electrode assembly 11 includes an electrolyte membrane 11c, a cathode 11a formed on one surface of the electrolyte membrane 11c, and an anode 11b formed on the other surface of the electrolyte membrane 11c. The cathode 11a is formed on the surface of the electrolyte membrane 11c except at an edge area of the electrolyte membrane 11c, and the anode 11b is formed on the other surface of the electrolyte membrane 11c except at the edge area of the electrolyte membrane 11c. In this case, the cathode 11a and the anode 11b may include a gas diffusion layer (GDL) and a micro-porous layer (MPL). The anode 11b oxidizes the fuel and separates the fuel into electrons and protons, the electrolyte membrane 11c moves the protons to the cathode 11a, and the cathode 11a reduces the electrons and the protons received from the anode 11b and an additionally-received oxidizing gas to generate water and heat.

According to the exemplary embodiment of the present invention, the stamped separator 13 is formed of a metal material (e.g., aluminum, copper, iron, nickel, or cobalt). Alternately, the separator 13 may be formed by an alloy of two or more of the metals. In this specification, the stamped separator has one or more stamped recesses which are formed by way of plastic deformation of the sheet metal and are formed, for example, by using stamping or die-pressing process. The stamping process is a press forming process in which a steel or metal plate is provide between lower and upper molds having protrusions and depressions, a pressure is applied to the lower and upper molds, and the shape of the protrusions and depressions is thereby formed on the steel plate. The metal separator 13 is formed in a quadrangle shape having a thickness of about 0.1-about 0.2 mm, which is thinner than a graphite separator. While the separator 13 is thinner thickness than the graphite separator, it has appropriate gas-tightness or liquid-tightness.

The stamped separator 13 has protrusions and depressions on both surfaces thereof that are formed by a stamping process, and at least one channel 15 or 16 is provided on each surface 13a and 13b of the separator 13 through the protrusions and depressions. In this case, the channels 15 and 16 are formed as grooves of the protrusions and depressions on both surfaces 13a and 13b of the separator 13. For convenience of description, one surface of the separator 13 is referred to as a first surface 13a, a channel formed on the first surface 13a is referred to as a first channel 15, another surface of the separator 13 is referred to as a second surface 13b, and a channel formed on the second surface 13b is referred to as a second channel 16. The first surface 13a of the separator 13 faces the cathode 11a of the membrane electrode assembly 11, and the second surface 13b faces the anode 11b of the membrane electrode assembly 11. The first channel 15 includes an oxidizing gas flow path for supplying the oxidizing gas to the cathode 11a, and the second channel 16 includes a fuel flow path for supplying the fuel to the anode 11b. Accordingly, the separator 13 according to the exemplary embodiment of the present invention includes the first channel 15 and the second channel 16 on the surfaces 13a and 13b, and it is formed as a bipolar plate.

Figure 4A:
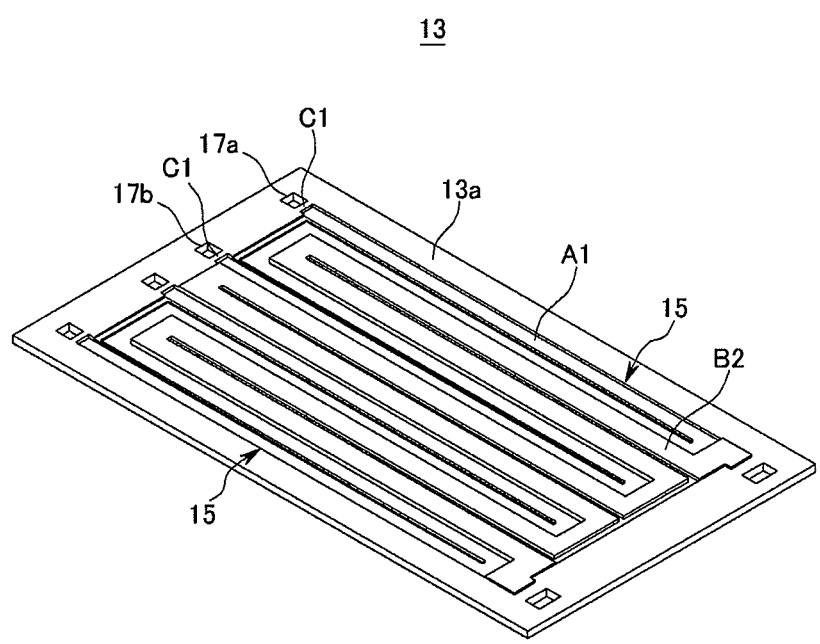
FIG. 4A and FIG. 4B respectively show perspective view representing a separator shown in FIG. 2.
Figure 4B:
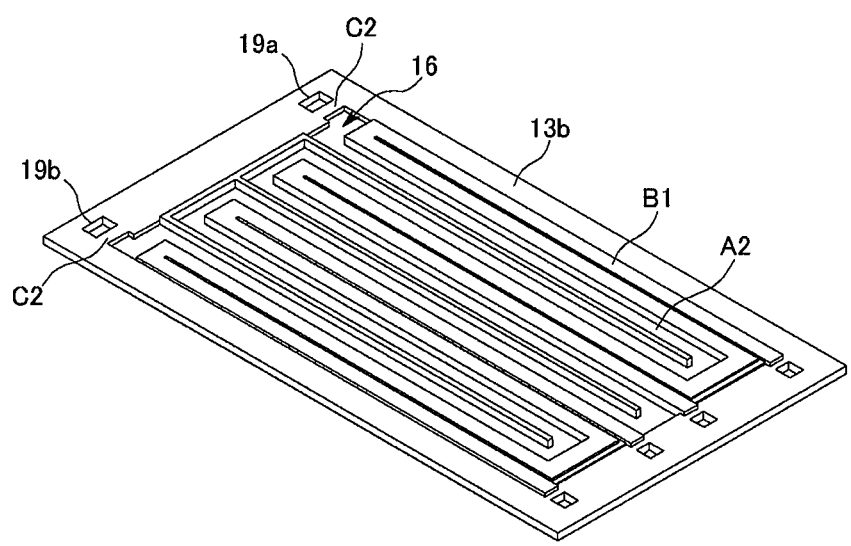

The first channel 15 and the second channel 16 are formed in a serpentine shape as shown in FIG. 4A and FIG. 4B. As shown in FIG. 4A, a plurality of the first channels 15 are formed on the first surface 13a of the separator 13. The first channel 15 is formed as a groove part A1 on the first surface of the separator 13 as shown in FIG. 4A, and it is formed as a protrusion part B1 on the second surface 13b of the separator 13 as shown in FIG. 4B. The protrusion part B1 is protruded to have a predetermined step difference from an edge area of the separator 13 at which no channels 15 or 16 are formed, as shown in FIG. 3. Here, both ends of the first channel 15 are closed as shown in FIG. 4A, the groove part A1 is formed to be apart from the cathode 11a of the membrane electrode assembly 11, and the protrusion part B1 is formed to touch the anode 11b of the membrane electrode assembly 11 as shown in FIG. 3.

A single second channel 16 is formed on the second surface 13b of the separator 13 as shown in FIG. 4B, and is formed between the oxidizing gas flow paths of the first channels 15 shown in FIG. 4A. That is, the second channel 16 is formed between the protrusion parts B1 of the first channels 15 on the second surface 13b of the separator 13, and it is not substantially overlapped with the first channel 15. The second channel 16 is formed as a groove part A2 on the second surface 13b of the separator 13 as shown in FIG. 4B, and it is formed as a protrusion part B2 on the first surface 13a of the separator 13 as shown in FIG. 4A. The protrusion part B2 is protruded to have a predetermined step difference from an edge area of the separator 13 at which no channels 15 or 16 are formed as shown in FIG. 3. Here, in a like manner of the first channel 15, both ends of the second channel 16 are closed as shown in FIG. 4B, the groove part A2 is formed to be apart from the anode 11b of the membrane electrode assembly 11, and the protrusion part B2 is formed to touch the cathode 11a of the membrane electrode assembly 11 as shown in FIG. 3.

In the exemplary embodiment of the present invention, since the protrusions and depressions are formed on both surfaces 13a and 13b of the separator 13 and the first channel 15 and the second channel 16 are provided to both surfaces 13a and 13b, the separator 13 is formed in a corrugated shape. The separator 13 includes first manifolds 17a and 17b communicating with the oxidizing gas flow path of the first channel 15 as shown in FIG. 4A, and second manifolds 19a and 19b communicating with the fuel flow path of the second channel 16 as shown in FIG. 4B. A pair of the first manifolds 17a and 17b is provided for each first channel 15, and the first manifolds 17a and 17b are respectively formed to be apart from both ends of the first channel 15. In addition, the first manifolds 17a and 17b are separately formed from the first channel 15, and are formed as a hole penetrating the separator 13. A part for separating both ends of the first channel 15 from the first manifolds 17a and 17b will be referred to as a "first part C1". The first manifolds 17a and 17b supply the oxidizing gas to the first channel 15, and output the oxidizing gas remaining after flowing through the first channel 15 and performing a reaction on the cathode 11a shown in FIG. 3 of the membrane electrode assembly 11 shown in FIG. 3, and water generated from the cathode 11a. As described, since the first manifolds 17a and 17b are provided as holes to the separator 13, the edge part of the membrane electrode assembly 11 includes holes corresponding to the first manifolds 17a and 17b as shown in FIG. 2.

A pair of the second manifolds 19a and 19b is provided to one second channel 16, and the second manifolds 19a and 19b are formed to be apart from both ends of the second channel 16. In addition, the second manifolds 19a and 19b are separately formed from the second channel 16, and are formed as holes penetrating the separator 13. Hereinafter, a part for separating both ends of the second channel 16 from the second manifolds 19a and 19b will be referred to as a "second part C2". The second manifolds 19a and 19b supply the fuel to the second channel 16, and output the fuel remaining after flowing through the second channel 16 and performing the reaction on the anode 11b shown in FIG. 3 of the membrane electrode assembly 11. As described, since the second manifolds 19a and 19b are provided as holes to the separator 13, holes corresponding to the second manifolds 19a and 19b are formed on the edge part of the membrane electrode assembly 11 shown in FIG. 2.

Accordingly, according to the exemplary embodiment of the present invention, since the first channel 15 and the second channel 16 are formed in the serpentine shape on both sides of the metal separator 13 formed by the stamping process, the volume of the entire stack may be reduced. In addition, according to the exemplary embodiment of the present invention, since the first manifolds 17a and 17b and the second manifolds 19a and 19b communicating with the first channel 15 and the second channel 16 are formed as holes on the separator 13, a pumping pressure for supplying the fuel and an oxidizing gas to the respective channels 15 and 16 is not increased.

Referring back to FIG. 2 and FIG. 3, the fuel cell stack 100 according to the exemplary embodiment of the present invention includes gaskets 31 and 32 for maintaining the air-tightness between the separator 13 and the membrane electrode assembly 11. The gaskets 31 and 32 are formed of a silicon rubber material having elasticity, include holes in which the respective electrodes 11a and 11b of the membrane electrode assembly 11 are positioned, and are disposed on an edge area between the separator 13 and the membrane electrode assembly 11. The gaskets 31 and 32 are disposed to closely contact the edge area of the separator having no channel and the edge area of the membrane electrode assembly 11 corresponding to the edge area of the electrolyte membrane 11c between both surfaces 13a and 13b of the separator 13 and the membrane electrode assembly 11. Here, the gaskets 31 and 32 are respectively disposed on an edge area between the separator 13 and the membrane electrode assembly 11 in the stack 100 in which the membrane electrode assembly 11 and the separator 13 are alternately arranged.

The gaskets 31 and 32 are classified as a first gasket 31 disposed between the edge area of the first surface 13a of the separator 13 and the edge area of the cathode 11a of the membrane electrode assembly 11 and a second gasket 32 disposed between the edge area of the second surface 13b of the separator 13 and the edge area of the anode 11b of the membrane electrode assembly 11. The first gasket 31 and the second gasket 32 are formed with a thickness obtained by adding a part having no channel in the separator 13, the step differences caused by the protrusion parts B1 and B2, and the electrodes 11a and 11b of the membrane electrode assembly 11, based on the separator 13 and the membrane electrode assembly 11 facing each other. That is, the first gasket 31 is formed with a thickness obtained by adding the part having no channel in the separator 13, the step difference caused by the protrusion part B2 of the second channel 16, and the cathode 11a of the membrane electrode assembly 11.

The second gasket 32 is formed with a thickness obtained by adding the part having no channel in the separator 13, the step difference caused by the protrusion part B1 of the first channel 15, and the anode 11b of the membrane electrode assembly 11. The first gasket 31 includes holes corresponding to the second manifolds 19a and 19b of the separator 13. In addition, the second gasket 32 includes holes corresponding to the first manifolds 17a and 17b shown in FIG. 4A of the separator 13. According to the exemplary embodiment of the present invention, the first gasket 31 includes a first passage 33 for forming a first path 41 shown in FIG. 5A between both ends of the first channel 15 and the respective first manifolds 17a and 17b. The second gasket 32 includes a second passage 35 for forming a second path 42 shown in FIG. 5B between both ends of the second channel 16 and the respective second manifolds 19a and 19b. The first passage 33 is formed as a first groove 33a for connecting both ends of the first channel 15 to the corresponding first manifolds 17a and 17b. In this case, both ends of the first channel 15, the respective first manifolds 17a and 17b, and the first part C1 shown in FIG. 4A between both ends of the first channel 15 and the respective first manifolds 17a and 17b are positioned in an area of the first groove 33a.

As shown in FIG. 5A, when the separator 13 and the membrane electrode assembly 11 are closely combined with the first gasket 31 therebetween, the first path 41 is formed by the first groove 33a through a gap corresponding to the thickness of the first gasket 31 between the separator 13 and the membrane electrode assembly 11. The first path 41 forms a passage connecting both ends of the first channel 15 to the respective first manifolds 17a and 17b with the thickness of the first gasket 31 by the first groove 33a. That is, the first path 41 forms the passage having the thickness of the first gasket 31 and connecting both ends of the first channel 15 to the respective first manifolds 17a and 17b with the first part C1 therebetween. Here, the first path 41 flows the oxidizing gas supplied from one (17a) of the first manifolds 17a and 17b to the first channel 15, and outputs the oxidizing gas that is not reacted in the cathode 11a of the membrane electrode assembly 11 and the water generated from the cathode 11a to the other (17b) of the first manifolds 17a and 17b.

Figure 5B:
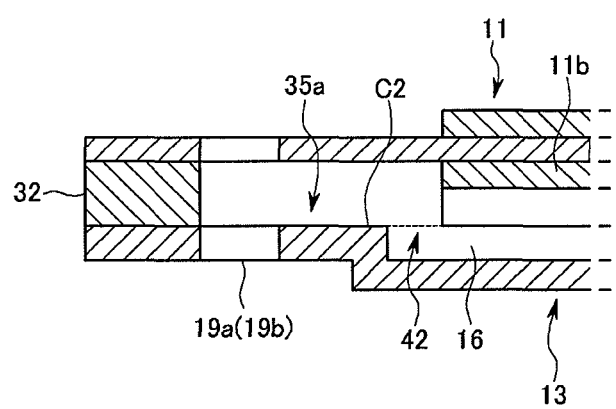

The second passage 35 is formed as a second groove 35a for connecting both ends of the second channel 16 to the respective second manifolds 19a and 19b. In this case, both ends of the second channel 16, the respective second manifolds 19a and 19b, and the second part C2 between both ends of the second channel 16 and the respective second manifolds 19a and 19b are positioned in an area of the second groove 35a. As shown in FIG. 5B, when the separator 13 and the membrane electrode assembly 11 are closely combined with the second gasket 32 therebetween, the second path 42 is formed by the second groove 35a through a gap corresponding to the thickness of the second gasket 32 between the separator 13 and the membrane electrode assembly 11. The second path 42 forms a passage connecting both ends of the second channel 16 to the respective second manifolds 19a and 19b with the thickness of the second gasket 32 by the second groove 35a. That is, the second path 42 forms the passage having the thickness of the second gasket 32 and connecting both ends of the second channel 16 to the respective second manifolds 19a and 19b with the second part C2 therebetween. Here, the second path 42 flows the fuel supplied from one (19a) of the second manifolds 19a and 19b to the second channel 16, and outputs the fuel that is not reacted in the anode 11b of the membrane electrode assembly 11 to the other one (19b) of the second manifolds 19a and 19b.

According to the fuel cell stack 100 according to the exemplary embodiment of the present invention, the oxidizing gas passing through one (17a) of the first manifolds 17a and 17b flows to the first channel 15 through the first path 41 formed by the first passage 33 of the first gasket 31. Thereby, the oxidizing gas flows along the first channel 15, and is supplied to the cathode 11a of the membrane electrode assembly 11.

In addition, the fuel passing through one (19a) of the second manifolds 19a and 19b flows to the second channel 16 through the second path 42 formed by the second passage 35 of the second gasket 32. Thereby, the fuel flows along the second channel 16, and is supplied to the anode 11b of the membrane electrode assembly 11. Accordingly, in the fuel cell stack 100 according to the exemplary embodiment of the present invention, the oxidation reaction of the fuel is performed by the anode 11b of the membrane electrode assembly 11, the reduction reaction of the oxidizing gas is performed by the cathode 11a of the membrane electrode assembly 11, and therefore the electrical energy having a predetermined capacity may be output.

In this process, the oxidizing gas that is not reacted in the cathode 11a of the membrane electrode assembly 11 and the water generated from the cathode 11a flow to the other one (17b) of the first manifolds 17a and 17b through the first path 41. In this case, the oxidizing gas and the water flowing to the first manifold 17b is output 21 to the outside of the stack through the port of the pressure plate 20.

In addition, the fuel that is not reacted in the anode 11b of the membrane electrode assembly 11 flows to the other one (19b) of the second manifolds 19a and 19b through the second path 42. In this case, the fuel flowing to the second manifold 19b is output to the outside of the stack through the port 21 of the pressure plate 20.

As described above, according to the exemplary embodiment of the present invention, since the metal separator including the stamping-processed channels on both surfaces are provided, the volume of the entire stack may be reduced. In addition, according to exemplary embodiment of the present invention, since the manifold is formed on the separator, and the manifold and the channel are connected by using the gasket, the pumping pressure for supplying the fuel and the oxidizing gas may not be increased. Accordingly, power consumption of a pump for supplying the fuel and the oxidizing gas may be reduced in the exemplary embodiment of the present invention.

While embodiments of the invention has been described, it is to be understood that the invention is not limited to the disclosed embodiments, but, on the contrary, is intended to cover various modifications and equivalent arrangements included within the spirit and scope of the appended claims.

What is claimed is:

1. A fuel cell stack, comprising:
a first membrane electrode assembly ("MEA");
a second MEA;
a stamped metal separator positioned between the first MEA and the second MEA, and
a gasket disposed between peripheries of the stamped metal separator and the first MEA;
wherein the stamped metal separator comprises a first surface facing the first MEA and a second surface facing the second MEA,
wherein the first MEA and the first surface of the stamped metal separator contact each other and form a first channel therebetween,
wherein the first channel has two ends, each of which is connected to a first manifold through which reactants or resultants from a fuel cell reaction may flow,
wherein the gasket forms a first passage interposed between the one of the two ends of the first channel and the first manifold,
wherein the first passage comprises a groove formed on the gasket,
wherein the second MEA and the second surface of the stamped metal separator contact each other and form a second channel therebetween,
wherein the second channel has two ends, each of which is connected to a second manifold through which reactants or resultants from the fuel cell reaction may flow,
wherein a first imaginary straight line passing through the two ends of the first channel does not intersect a second imaginary straight line passing through the two ends of the second channel when viewed in a direction generally perpendicular to a surface of the MEA contacting the first surface,
wherein the first MEA comprises an electrolyte membrane, a cathode formed on one surface of the electrolyte membrane except at a periphery of the electrolyte membrane, and an anode formed on another surface of the electrolyte membrane except at the periphery,
wherein the first MEA and the first surface form another first channel therebetween,
wherein the another first channel has two ends, each of which is connected to another first manifold through which reactants or resultants of a fuel cell reaction are configured to flow, and
wherein a third imaginary straight line passing through the two ends of the another first channel does not intersect the second imaginary straight line when viewed in the direction generally perpendicular to the surface of the MEA contacting the first surface.

2. The fuel cell stack of claim 1, wherein each of the first and second surfaces comprises protrusions and depressions.

3. The fuel cell stack of claim 1, wherein the stamped metal separator comprises a plurality of stamped corrugations.

4. The fuel cell stack of claim 1, wherein each of the first and second channels is formed in a serpentine shape.

5. The fuel cell stack of claim 1, wherein each of the first and second manifolds comprises a hole formed on the stamped metal separator.

6. The fuel cell stack of claim 1, wherein both ends of each of the first and second channels are closed in the separators.

7. The fuel cell stack of claim 1, wherein the first channel and the first manifold are separately formed on the stamped metal separator, and wherein the second channel and the second manifold are separately formed on the stamped metal separator.

8. The fuel cell stack of claim 1, wherein the first channel is configured to supply an oxidizing gas to the first MEA.

9. The fuel cell stack of claim 1, wherein the second channel is configured to supply a fuel to the second MEA.

10. The fuel cell stack of claim 1, wherein the stamped metal separator comprises only a single stamped recess on the second surface which is configured to form the second channel.

11. The fuel cell stack of claim 1, wherein the stamped metal separator comprises at least one material selected from the group consisting of aluminum, copper, iron, nickel, and cobalt.

12. The fuel cell stack of claim 1, wherein the stamped metal separator comprises a bipolar plate.

13. The fuel cell stack of claim 1, wherein the gasket contacts the electrolyte membrane and the first surface of the stamped metal separator to form a seal between the peripheries of the first MEA and the stamped metal separator.

14. The fuel cell stack of claim 1, wherein the gasket is formed of silicon rubber.

15. The fuel cell stack of claim 1 further comprising one or more additional stamped metal separators, wherein the stamped metal separators and the first and the second MEAs are arranged alternately.

16. The fuel cell stack of claim 1, wherein the fuel cell stack comprises a direct oxidation fuel cell.

17. The fuel cell stack of claim 1, wherein the first surface comprises a stamped recess configured to form the first channel.

* * * * *